United States Patent
Dheeradhada et al.

(10) Patent No.: US 11,780,020 B2
(45) Date of Patent: Oct. 10, 2023

(54) EXOTHERMIC BRAZE PRECURSOR MATERIAL

(71) Applicant: General Electric Company, Schenectady, NY (US)

(72) Inventors: Voramon Supatarawanich Dheeradhada, Latham, NY (US); Raghavendra Rao Adharapurapu, Bangalore (IN); Juan Borja, Latham, NY (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/072,064

(22) Filed: Nov. 30, 2022

(65) Prior Publication Data

US 2023/0101214 A1    Mar. 30, 2023

Related U.S. Application Data

(63) Continuation of application No. 17/221,440, filed on Apr. 2, 2021, now Pat. No. 11,541,470.

(51) Int. Cl.
*B23K 1/00*     (2006.01)
*B23K 35/02*    (2006.01)
(Continued)

(52) U.S. Cl.
CPC ........ *B23K 1/0006* (2013.01); *B23K 35/0244* (2013.01); *B23K 35/3033* (2013.01);
(Continued)

(58) Field of Classification Search
None
See application file for complete search history.

(56) References Cited

U.S. PATENT DOCUMENTS

| 3,067,508 A | 12/1962 | Kinelski |
| 3,277,150 A | 10/1966 | Rhys |
| (Continued) | | |

FOREIGN PATENT DOCUMENTS

| BR | 112013022876 A2 | 12/2016 |
| CA | 2956355 A1 | 8/2017 |
| (Continued) | | |

OTHER PUBLICATIONS

Anonymous: "Brazing." Wikipedia, Jul. 10, 2018, XP055790807, Retrieved from the Internet: ULRL: <https://en.wikipedia.org/wiki/Brazing> 28 pages.
(Continued)

*Primary Examiner* — Erin B Saad
*Assistant Examiner* — Carlos J Gamino
(74) *Attorney, Agent, or Firm* — Fitch Even Tabin & Flannery LLP

(57) ABSTRACT

A method of furnace-less brazing of a substrate is provided. The method includes providing a substrate having a brazing region thereon; disposing braze precursor material containing a nickel powder, an aluminum powder, and a platinum group metal powder on the brazing region; and initiating an exothermic reaction of the braze precursor material such that the exothermic reaction produces a braze material that reaches a braze temperature above the liquidus temperature for the braze material. A braze precursor material is also provided.

16 Claims, 9 Drawing Sheets

(51) Int. Cl.
  *B23K 35/30* (2006.01)
  *B23P 6/00* (2006.01)
  *B23P 6/04* (2006.01)
  *B23K 101/00* (2006.01)

(52) U.S. Cl.
  CPC .............. *B23P 6/007* (2013.01); *B23P 6/045* (2013.01); *B23K 2101/001* (2018.08)

(56) References Cited

U.S. PATENT DOCUMENTS

| | | | |
|---|---|---|---|
| 3,415,697 | A | 12/1968 | Bredzs |
| 3,503,814 | A | 3/1970 | Helms, Jr. |
| 3,899,306 | A | 8/1975 | Knopp |
| 4,110,887 | A | 9/1978 | Kachik |
| 4,247,305 | A | 1/1981 | Daniels |
| 4,405,391 | A | 9/1983 | Decristofaro |
| 4,596,354 | A | 6/1986 | Moorhead |
| 4,611,744 | A | 9/1986 | Fraser |
| 5,381,944 | A | 1/1995 | Makowiecki |
| 6,451,454 | B1 | 9/2002 | Hasz |
| 6,544,668 | B1 | 4/2003 | Santella |
| 6,616,032 | B1 | 9/2003 | Gasse |
| 6,736,942 | B2 | 5/2004 | Weihs |
| 6,742,698 | B2 | 6/2004 | Shah |
| 6,827,254 | B2 | 12/2004 | Hasz |
| 7,533,795 | B2 | 5/2009 | Schaeffer |
| 7,588,179 | B2 | 9/2009 | Simpson |
| 7,854,064 | B2 | 12/2010 | Malley |
| 7,975,902 | B2 | 7/2011 | Wilden |
| 8,074,864 | B2 | 12/2011 | Lofton |
| 8,609,185 | B2 | 12/2013 | Tuppen |
| 8,904,635 | B2 | 12/2014 | Berkebile |
| 9,221,101 | B2 | 12/2015 | Hugot |
| 9,283,593 | B2 | 3/2016 | Bruck |
| 9,315,903 | B2 | 4/2016 | Bruck |
| 9,352,413 | B2 | 5/2016 | Bruck |
| 9,352,419 | B2 | 5/2016 | Bruck |
| 9,499,895 | B2 | 11/2016 | Langan |
| 9,517,521 | B2 | 12/2016 | Tiwari |
| 9,770,781 | B2 | 9/2017 | Bruck |
| 10,087,118 | B2 | 10/2018 | Weihs |
| 2001/0046597 | A1 | 11/2001 | Weihs |
| 2007/0017958 | A1 | 1/2007 | Hasz |
| 2007/0044306 | A1 | 3/2007 | Szela |
| 2009/0026182 | A1 | 1/2009 | Hu |
| 2011/0027547 | A1 | 2/2011 | Xun |
| 2011/0031301 | A1 | 2/2011 | Segletes |
| 2012/0061454 | A1 | 3/2012 | Rudd |
| 2012/0110847 | A1 | 5/2012 | Berkebile |
| 2014/0356056 | A1 | 12/2014 | Xie |
| 2015/0110962 | A1 | 4/2015 | Gollerthan |
| 2016/0229005 | A1 | 8/2016 | Ryan |
| 2017/0014930 | A1 | 1/2017 | Easley |
| 2017/0218762 | A1 | 8/2017 | Roberts |
| 2017/0218763 | A1 | 8/2017 | Diwinsky |
| 2022/0314352 | A1 | 10/2022 | Dheeradhada |

FOREIGN PATENT DOCUMENTS

| | | |
|---|---|---|
| CN | 101220435 | 7/2008 |
| CN | 101316940 | 12/2008 |
| CN | 104428101 | 3/2015 |
| CN | 104625474 | 5/2015 |
| CN | 104955612 A | 9/2015 |
| CN | 106884103 | 6/2017 |
| CN | 108672978 | 10/2018 |
| CN | 109154035 | 1/2019 |
| DE | 102016101949 A1 | 8/2016 |
| EP | 1516942 A1 | 3/2005 |
| EP | 1518636 | 3/2005 |
| EP | 2182092 A2 | 5/2010 |
| EP | 2808113 | 12/2014 |
| EP | 3203020 A1 | 8/2017 |

OTHER PUBLICATIONS

Messler et al., "Welding with self-propagating high-temperature synthesis." Welding Journal, Oct. 1995, pp. 37-41.

EXOTHERMIC BRAZE PRECURSOR MATERIAL

CROSS-REFERENCE TO RELATED APPLICATION

This application is a continuation of prior application Ser. No. 17/221,440, filed Apr. 2, 2021, which is hereby incorporated herein by reference in its entirety.

FIELD

The present subject matter relates generally to methods of furnace-less brazing. More particularly, the present subject matter relates to a braze material capable of sustaining an exothermic reaction for braze joining and/or repair of a substrate.

BACKGROUND

Superalloys are used in the manufacture of components that must operate at high temperatures, such as blades, nozzles, combustors, and shrouds of aerospace or industrial gas turbines. During the operation of such components under strenuous high temperature conditions, various types of damage or deterioration can occur, including oxidation, wear and cracking. Accordingly, improved brazing methods are required for repairing components of turbine engines.

BRIEF DESCRIPTION

Aspects and advantages of the invention will be set forth in part in the following description, or may be obvious from the description, or may be learned through practice of the invention.

In one exemplary embodiment of the present subject matter, a method of furnace-less brazing of a substrate is provided. The method includes providing a substrate having a brazing region thereon; disposing braze precursor material containing a nickel powder, an aluminum powder, and a platinum group metal powder on the brazing region; and initiating an exothermic reaction of the braze precursor material such that the exothermic reaction produces a braze material that reaches a braze temperature above the liquidus temperature for the braze material.

In a further exemplary embodiment of the present subject matter, a braze precursor material is provided. The braze precursor material comprises a nickel powder, an aluminum powder, and a platinum-group metal powder, the braze precursor material capable of producing a braze material having a braze temperature to propagate and sustain an exothermic reaction, wherein after the exothermic reaction a solidified braze material is formed, the solidified braze material comprising a nickel alloy having at least 5 vol. % gamma (FCC) phase.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
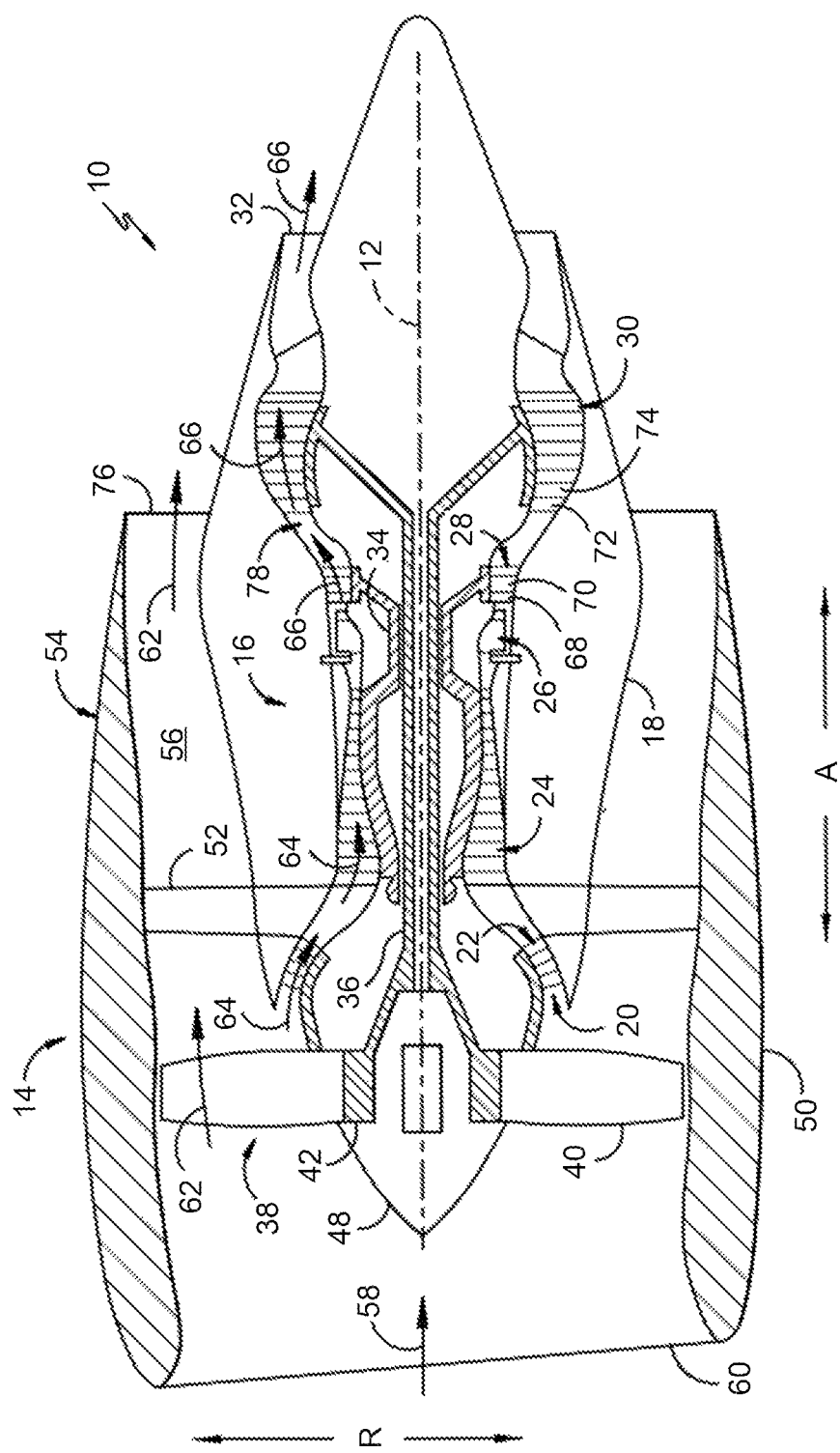
FIG. 1 provides a schematic cross-section view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location, order, or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent relative margin.

As used herein the term "powder" or the like refers to a collection of particles. The particles may be of any configuration, shape or size as long as they are suitable for the flowability, dispersion and/or compaction thereof. In some embodiments, a median particle size of the powder is less than about 100 micrometers.

As used herein the term "median particle size" refers to median value of the particle size distribution, also known as d50 median.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Because the cost of components formed from superalloys is relatively high, it is often more desirable to repair these components than to replace them. For the same reason, new-make components that require repair due to manufacturing flaws are also preferably repaired instead of being scrapped. Furthermore, in some manufacturing operations that require braze joining, it is preferable not to subject the entire part to the brazing temperature, as would be the case in conventional isothermal brazing.

Generally, the present subject matter provides a method of furnace-less brazing of a substrate, including joining for manufacturing and repair. The method includes providing a substrate having a brazing region thereon; disposing braze precursor material containing a nickel powder, an aluminum powder, and a platinum group metal powder on the brazing region; and initiating an exothermic reaction of the braze precursor material such that the braze precursor material reaches a braze temperature above the melting temperature for the braze precursor material; wherein after the exothermic reaction of the braze precursor material a solidified braze material is formed. For instance, the braze precursor material is capable of heating up to a braze temperature at which the resulting alloy is at least partially melted, so as to form a metallurgical bond between the substrate and the solidified braze material. Braze precursor materials and methods for in-situ repair of gas turbine engine components are also provided. The brazing methods and materials disclosed herein are suitable for brazing components without the use of a vacuum furnace. Thus, the brazing methods and materials disclosed herein can be used for a variety of repairs where furnace brazing is not feasible or desired.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan engine 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air indicated by arrows 62 and the second portion of air as indicated by arrows 64 is commonly known as a bypass ratio. The pressure of the second portion of air as indicated by arrows 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air indicated by arrows 62 is substantially increased as the first portion of air indicated by arrows 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

As noted above certain components of the turbine engine can be fabricated from metal materials, such as metal alloys, including superalloys. After continued use, one or more components of the engine 10 may become damaged. For example, certain metallic components of the engine may develop one or more cracks or pits due to oxidation, corrosion, or thermo-mechanical stresses.

Figure 2:
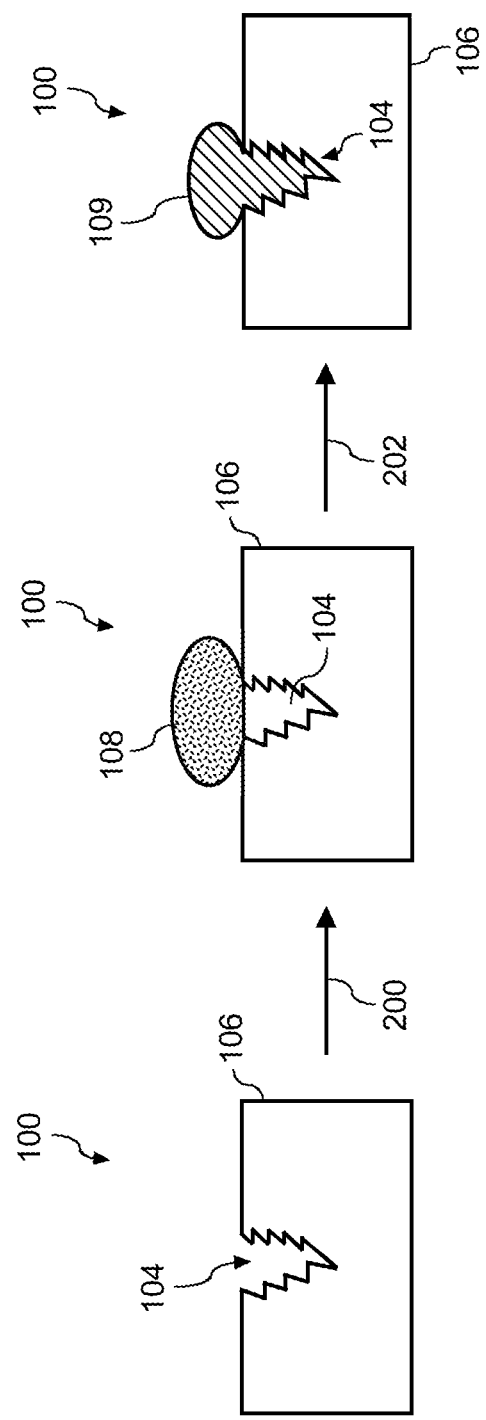
FIG. 2 illustrates a portion of a component having a repair region thereon repaired according to exemplary embodiments of the present disclosure.

Referring now to FIG. 2, a cross section view of a component 100 including a braze region 104 is shown. In FIG. 2, the braze region 104 can be a repair region including a damaged area in need of repair. For instance, the damaged area can include a crack or pit in the substrate 106 of the component 100. At 200 a braze precursor material 108 is disposed on or about the repair region 104. At 202 the braze precursor material 108 is ignited such that an exothermic reaction of the braze precursor material 108 takes place, forming molten braze material. Once cooled, the molten braze material solidifies creating a solidified braze material 109 in braze region 104 of the substrate 106.

Figure 3:
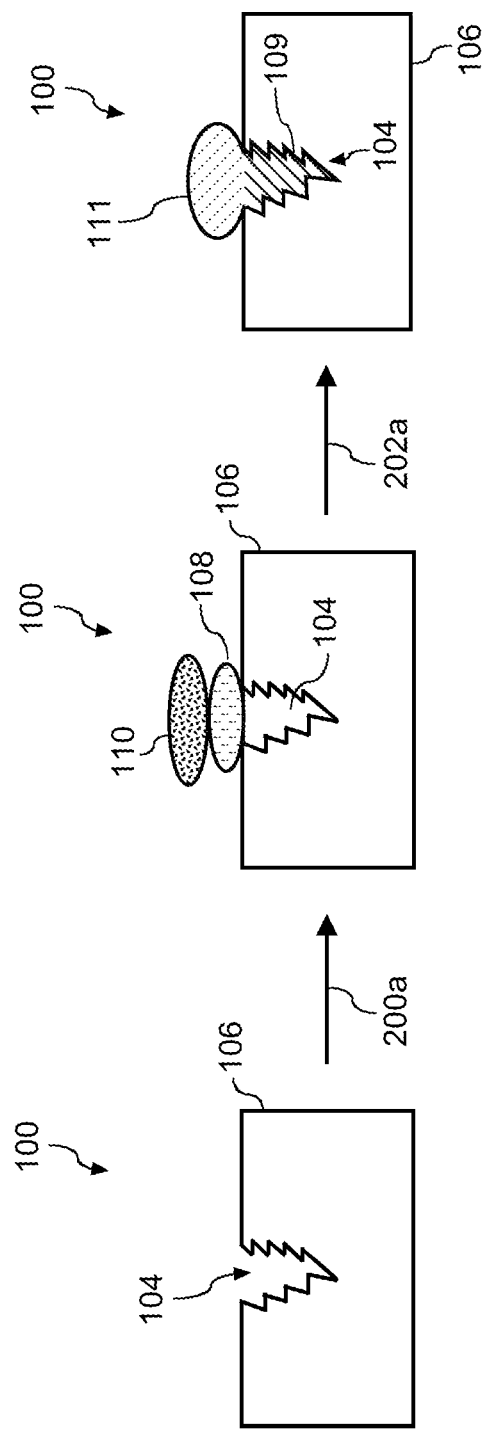
FIG. 3 illustrates a portion of a component having a repair region thereon repaired according to exemplary embodiments of the present disclosure.

In other embodiments, as shown in FIG. 3, a heat source material 110 is disposed over or around the braze precursor material 108. The braze precursor material 108 is disposed on the braze region 104 of the substrate 106. For example, at 200a a heat source material 110 and the braze precursor material 108 are disposed on the braze region 104. At 202a an exothermic reaction is initiated in the braze precursor material 108 and the heat source material 110, such that an exothermic reaction of the braze precursor material 108 takes place, forming molten braze material. The molten braze material can infiltrate the braze region 104 and repair substrate 106. The heat source material 110 can provide additional heat for the exothermic reaction of the braze precursor material 108. The heat source material 110 is capable of exothermically reacting to facilitate brazing. In some embodiments, the heat source material 110 does alter the braze composition. In other embodiments, depending on the desired properties for the solidified braze material 109, the heat source material 110 may alloy with the molten braze material to participate in metallurgical bonding of the molten braze material to the substrate 106. Once cooled, the molten braze material solidifies, creating a solidified braze material 109 in braze region 104 of the substrate 106.

Figure 4:
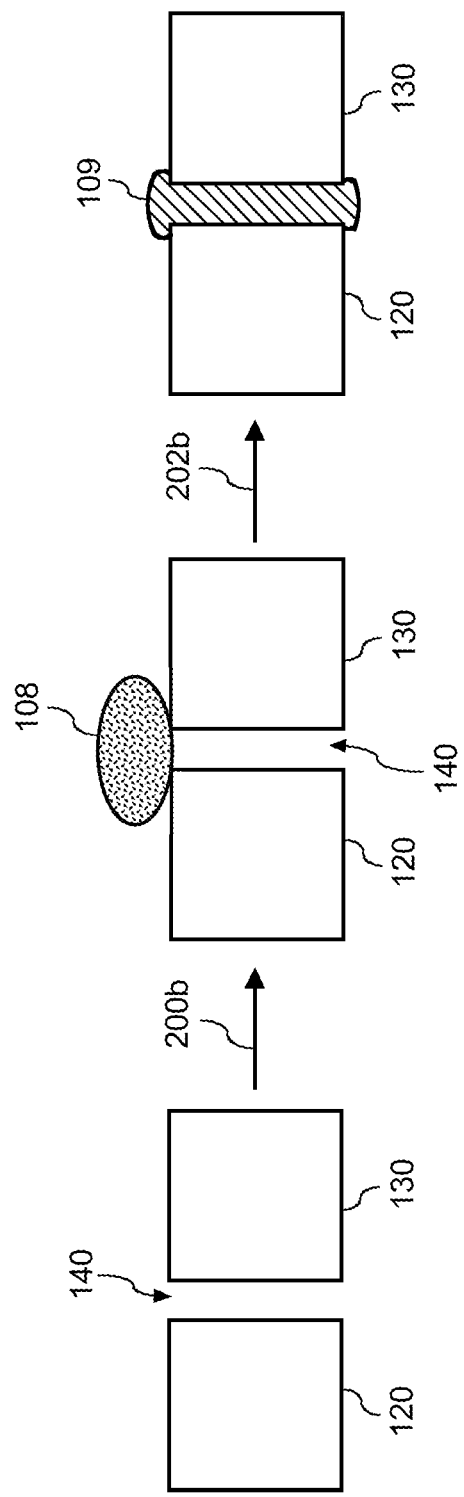
FIG. 4 illustrates a portion of a component having a repair region thereon repaired according to exemplary embodiments of the present disclosure.

As shown in FIG. 4, it may be necessary to join two metallic components. Accordingly, a first component 120 and a second component 130 can be brought together such that a joint gap 140 is formed between the first and second components. At 200b the braze precursor material 108 is disposed on, in, or around the joint gap 140. At 202b an exothermic reaction is initiated in the braze precursor material 108, forming a molten braze material from the braze precursor material 108 that fills joint gap 140. The molten braze material can re-solidify resulting in solidified braze material 109 in the joint gap 140 between the first component 120 and the second component 130, thus effectively joining the two components.

Figure 5:
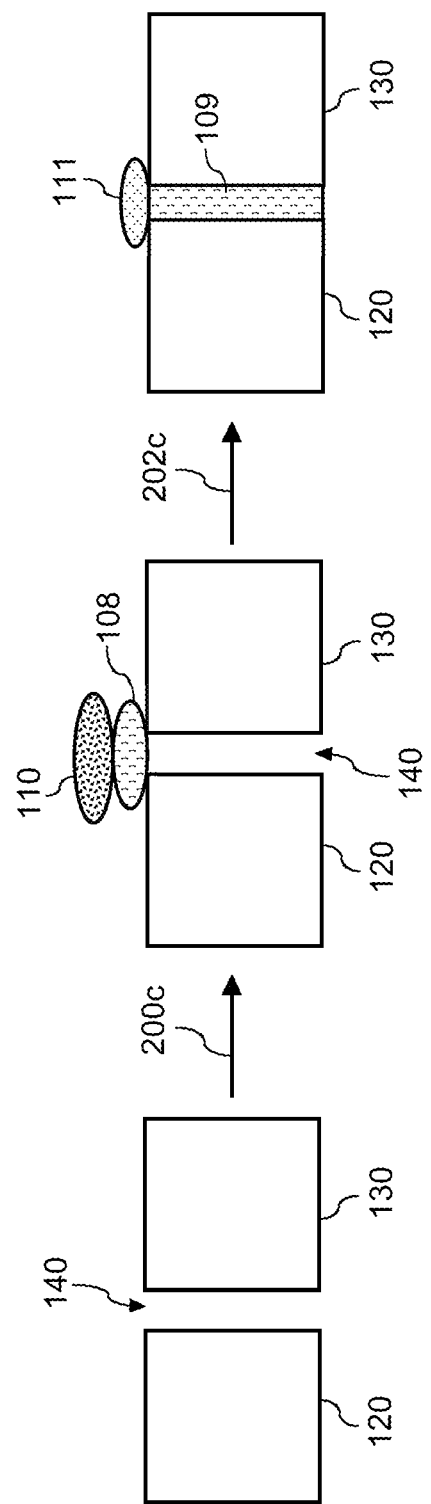
FIG. 5 illustrates a portion of a component having a repair region thereon repaired according to exemplary embodiments of the present disclosure.

Similar to example embodiments as shown in FIG. 3, in FIG. 5, a heat source material 110 can be disposed on or around the braze precursor material 108 to facilitate brazing. For example, at 200c the braze precursor material 108 can be disposed on the joint gap 140 and the heat source material 110 can be disposed on or around the braze precursor material 108. At 202c an exothermic reaction is initiated in the braze precursor material 108 and the heat source material 110, such that an exothermic reaction of the braze precursor material 108 takes place, forming molten braze material. The molten braze material can infiltrate the joint gap 140. Once cooled, the molten braze material solidifies creating a solidified braze material 109 in the joint gap 140, thus joining the two components together. The heat source material 110 can provide additional heat to the braze material formed from the exothermic reaction of the braze precursor material 108. The heat source material 110 can be capable of exothermically reacting to facilitate brazing of the molten braze material and/or improving the quality of the braze. In some embodiments, the heat source material 110 does not participate in the braze. For example, the heat source material 110, does not alloy with the molten braze material to participate in bonding of the molten braze material to component 120 and component 130. However, in other embodiments, depending on the desired properties for the solidified braze material 109, the heat source material 110 may mix with the molten braze material to participate in metallurgical bonding of the molten braze material to component 120 and component 130.

Figure 6:
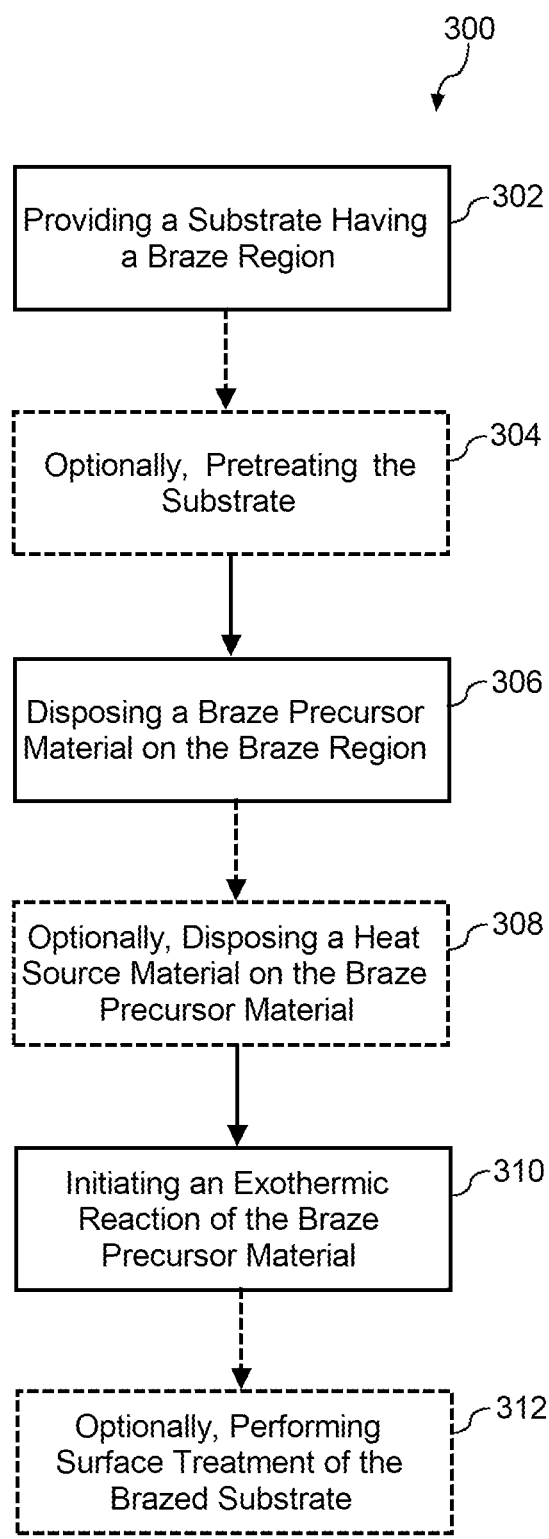
FIG. 6 illustrates a flowchart of an example method according to exemplary embodiments of the present disclosure.

A method 300 as shown in FIG. 6 may be used for brazing components. At 302 the method includes providing a substrate having a braze region thereon. The braze region can include a repair region such as a pit, a partial crack, a through-thickness crack, or combinations thereof. In embodiments, the braze region includes a joint gap between one or more components to be joined together. The substrate can be a metallic substrate such as a nickel-based alloy or superalloy, an iron-based alloy or superalloy, a cobalt-based alloy or superalloy, a titanium-based alloy or superalloy, or combinations thereof. In the case of a superalloy material, the superalloy is typically formed of a nickel-base or a cobalt-base alloy, wherein nickel or cobalt is the single greatest element in the superalloy by weight. Illustrative nickel-base superalloys include at least about 40 wt % Ni, and at least one component from the group consisting of cobalt, chromium, aluminum, tungsten, molybdenum, titanium, and iron. Examples of nickel-base superalloys are designated by the trade names Inconel®, Nimonic®, Rene® (e.g., Rene®80, Rene®95, Rene®142, and Rene®N5 alloys), and Udimet®, and include directionally solidified and single crystal superalloys. Illustrative cobalt-base superalloys include at least about 30 wt % Co, and at least one component from the group consisting of nickel, chromium, aluminum, tungsten, molybdenum, titanium, and iron. Examples of cobalt-base superalloys are designated by the trade names Haynes®, Nozzaloy®, Stellite® and Ultimet®. In the case of turbine components, the substrate may be in the form of a turbine nozzle, shroud, shroud hanger, pressure balance seal, blade, case or combustor component.

At 304, the method includes optionally pretreating the substrate. For example, the substrate can be pretreated to remove contaminants, such as oxide layers, dust, or corrosion products, so as to facilitate wetting of the brazing material to the substrate 106. For example, the repair region may be chemically cleaned, detergent washed, or mechanically ground, sanded, grit blasted or drilled to prepare the surface for brazing.

At 306 the method includes disposing a braze precursor material on the braze region of the substrate. The composition of the braze precursor material will be explained in more detail hereinbelow.

At 308, the method optionally includes disposing a heat source material on or around the brazing material on the braze region. The heat source material can be an exothermic heat source material capable of reacting and providing heat to raise the temperature of the braze precursor material and/or molten braze material, so as to achieve a desired braze temperature resulting in metallurgical bonding between the braze material and the substrate. The heat source material can be formulated depending on the composition of the braze precursor material and the underlying substrate. For example, in embodiments the heat source material can include one or more metal powders. For example, the heat source material can include a mixture of aluminum powder and nickel powder. Other metal powders can be added to the heat source material depending on the desired heat properties necessary for facilitating brazing. The heat source material can facilitate brazing of the molten braze material on the substrate and can improve the quality of the braze. Once ignited, the braze precursor material and heat source material result in molten braze material and molten heat source material. In some embodiments, the heat source material does not participate in the braze. For instance, elements or components of the heat source material do not substantially mix or alloy with the elements of the braze material along braze regions in the substrate. Thus, the heat source material facilitates brazing but does not substantially alter the composition of the braze. In other embodiments, it may be desirous for certain components of the heat source material to participate in the braze. In such embodiments, the heat source material can melt and alloy with the molten braze material and elements of the molten heat source material can participate in metallurgical bonding with the molten braze material along braze regions on the substrate.

In addition to providing a source of auxiliary heat for the braze reaction, the heat source material can help improve the quality of the resulting braze. For instance, addition of the heat source material can result in a denser solidified braze material and may facilitate wetting of the braze material to the substrate.

At 310 the method includes initiating an exothermic reaction of the braze precursor material for brazing the braze region of the substrate. The braze precursor material can be ignited with an external heat source, such as a combustion torch, a laser, or an electric heater. For example, in certain embodiments, a hydrogen flame torch can be used to ignite the braze precursor material. Accordingly, in certain embodiments the braze precursor material can be heated directly to initiate the exothermic reaction. In other embodiments, the braze precursor material may be indirectly heated to initiate the exothermic reaction, such as by heating the underlying substrate.

Once initiated, the exothermic reaction of the braze precursor material is capable of rapidly propagating through the volume of the reacting material and the heat can raise the temperature sufficiently so as to melt the braze precursor material and provide a metallurgical bond to the substrate. Accordingly, the exothermic reaction of the braze precursor material produces a molten braze material. In embodiments where the repair region constitutes a pit or a crack, the molten braze material flows into and fills the pit or crack. In other embodiments, where the braze is used to join components, the molten braze material flows into and fills the joint gap between the two components. For example, the molten braze material can reach a braze temperature that can partially melt adjacent surfaces of the substrate such that the molten substrate material intermixes with the molten braze material, thus bonding the molten braze material with the substrate.

Upon completion of the exothermic reaction at 310, the molten braze material cools thus re-solidifying to form a repaired substrate. Cooling of the molten braze material forms solidified braze material. The solidified braze material has suitable ductility and strength, such that the repaired substrate or joined components can be used in their respective applications. For example, the solidified braze material can comprise a nickel-based alloy having at least 5 vol. % gamma (FCC) phase. The braze material thus provided has sufficient ductility and compatibility with metal substrates as compared to other known exothermic materials. Optionally, additional machining or surface modification of the substrate can be performed.

The braze material described herein includes one or more metal powders. For example, the braze material can include nickel powder, aluminum powder, platinum-group metal powder, or combinations thereof. For example, "platinum-group metal powder" as used herein refers to metal powders including one or more of the platinum-group metals comprising platinum, palladium, rhodium, ruthenium, osmium, and iridium. In some embodiments, the powder included in the braze precursor material may be made of any materials, such as, nickel, chromium, iron, niobium, tantalum, molybdenum, titanium, aluminum, palladium, titanium, cobalt, carbon, manganese, silicon, boron, copper, or any combination thereof. In some embodiments, the powders included in the braze precursor material may be partially pre-alloyed. For example, the braze precursor material can include a pre-alloyed nickel-palladium powder, pre-alloyed nickel-aluminum powder, a pre-alloyed aluminum-palladium powder, and any combination thereof. As used herein "metal powder" is not limited to only elemental metal powders. For example, a powder containing pre-alloyed nickel-palladium powder would be considered both a nickel powder and a palladium powder, given that both metal elements are present in the powder. Similarly, powder mixtures containing multiple metal elements can be used as suitable powders according to example embodiments provided herein. Furthermore, the powders utilized can be pretreated according to suitable processes prior to being introduced into the braze precursor material. For example, the powders can be partially or fully oxidized prior to their incorporation into the braze precursor material.

Figure 7:
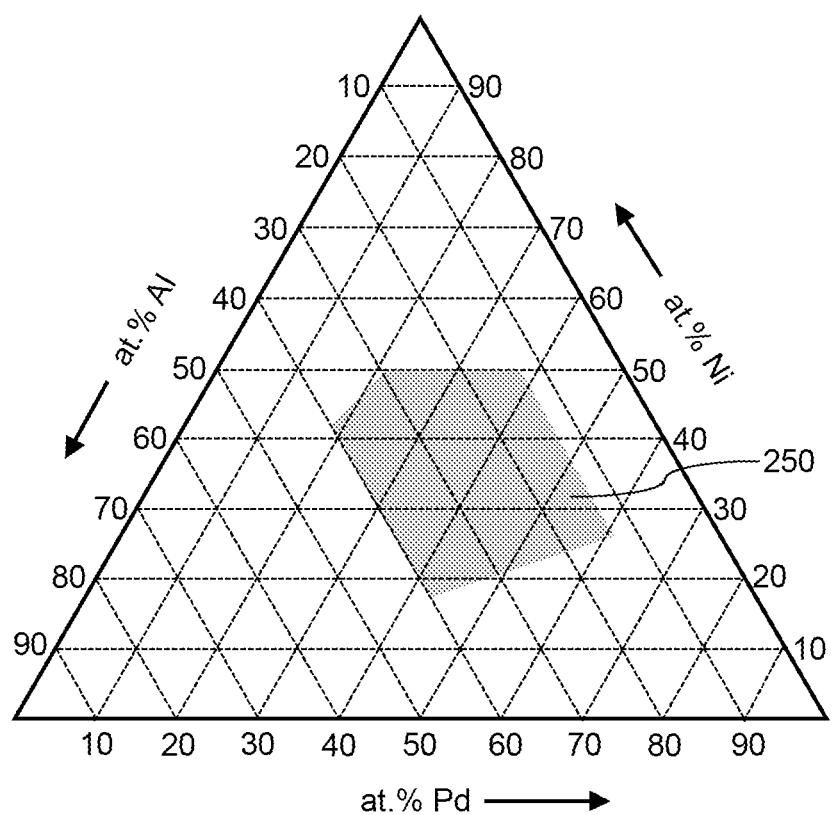
FIG. 7 illustrates a composition range of a Ni—Al—Pd ternary alloy composition according exemplary embodiments of the present disclosure.

As shown in FIG. 7, the braze precursor material can include a ternary alloy composition containing certain atomic percentages of nickel, aluminum, and palladium as indicated by area 250. In embodiments, the braze precursor material can include an atomic ratio of palladium to nickel of from about 0.43 to 2.33, such as 0.54 to 1.67. In other embodiments, the braze precursor material can include an atomic ratio of aluminum to a sum of palladium and nickel of from about 0.15 to 0.67, such as from about 0.16 to 0.47. In some embodiments, the braze precursor material comprises less than or equal to 50 atomic % nickel. In embodiments, the braze precursor material is nickel-based, wherein nickel is the single greatest element of the braze material by atomic weight.

Indeed, the specific amounts of metal powders used in the braze precursor material can be tailored depending on the material of the underlying substrate but also on the desired braze temperature for the braze material. The braze precursor material provided is capable, upon ignition, of propagating and sustaining an exothermic reaction producing a braze temperature above the solidus and/or liquidus temperature of the molten braze material. For instance, once ignited, metal powders in the braze precursor material begin to melt forming a molten braze material comprising elements of the metal powders in the braze precursor material. The resulting, molten braze material is capable of reaching a desired braze temperature that is above the melting point for the molten braze material. In some embodiments, the molten braze material is capable of reaching a braze temperature that is above the liquidus temperature or solidus temperature of the molten braze material. The term "liquidus temperature" is known in the art, and described, for example, in U.S. Pat. No. 4,414,178 to mean the temperature above which all of the metal in the braze material is liquid. The term "solidus temperature" quantifies the temperature at which melting of the braze material begins but is not necessarily melted completely. Generally, the brazing temperature is selected to be below the solidus temperature of the substrate but above the liquidus of the braze composition.

Advantageously, since the braze precursor material provided herein is capable of exothermically generating a braze temperature above the liquidus temperature for the resulting molten braze material, no furnace is required for repair.

Optionally, the braze material can include one or more materials for lowering the melting point of the braze material so as to ensure that the braze precursor material melts before the underlying substrate. Melting point suppressants for brazes of interest can include silicon, boron, palladium, phosphorus, or combinations thereof.

The braze precursor material can also include one or more flux materials for promoting de-oxidation and subsequent wetting of the substrate.

The braze precursor material may contain a variety of further alloying additions, such as for enhancing strength, ductility, and oxidation resistance of the braze. Economic considerations (e.g., the cost of braze constituents), as well as material availability and compatibility to the substrate, are also considerations. Additionally, the braze precursor material may include one or more metal oxides so as to increase the adiabatic reaction temperature, delay the initiation temperature of the reaction, and/or modify the final braze composition. For example, the braze precursor material can include up to about 15 atomic % of nickel oxide and/or cobalt oxide.

As noted, the braze precursor material includes one or more metal powders, for example, nickel powder, cobalt powder, aluminum powder, palladium powder, platinum powder, or combinations thereof. In such embodiments, the particle size of the powders selected can be critical for propagating and sustaining the exothermic reaction such that the desired braze temperature can be reached and maintained for a desired period of time. For example, including metal powders having median particle sizes that are too low or too high can result in a braze material that does not reach the desired braze temperature or can reach braze temperature too quickly and burn out before the brazing process is completed. Indeed, if the exothermic reaction cannot produce enough heat for a sufficient period of time to fully melt the brazing precursor material, achieving a good metallurgical repair is impossible. Accordingly, in embodiments, the nickel powder in the braze precursor material has a median particle size of from about 50 µm to about 90 µm, and the aluminum powder has a median particle size of from about 3 µm and less than 75 µm, such as about 5 µm to about 35 µm. The desired ratio of the median particle size of the nickel powder to the median particle size of the aluminum powder is from about 7:1 to about 2:1.

The braze precursor material can be disposed in any suitable form, including a preform pellet. For example, in embodiments, the braze precursor material includes one or more metal powders compacted into a preform pellet.

In other embodiments, the metal particles comprising the braze precursor material can be formulated in a suitable binder/solvent matrix to make a paste, slurry, or putty that can be easily applied to repair regions of the substrate. The solvents can be either aqueous or organic. The binders are often water-based materials such as polyethylene oxide and various acrylics; or solvent-based materials. The slurry can contain a variety of other conventional additives, such as dispersants, wetting agents, deflocculants, stabilizers, anti-settling agents, thickening agents, plasticizers, emollients, lubricants, surfactants, anti-foam agents, and curing modifiers. The slurry can be deposited on the substrate (or between two substrates being joined) by any convenient technique, in one or more layers, such as by extrusion from a syringe. Prior to being heated to a brazing temperature, the slurry can be heat-treated by any suitable means, so as to remove some or all of its volatile components.

Optionally, the braze precursor material can be disposed in the form of a tape preform. For example, the slurry described above can be tape-cast to produce a free-standing sheet or tape. Tape-casting methods are known in the art. Usually, the slurry is tape-cast onto a removable support sheet, e.g., a plastic sheet formed of a material such as Mylar®. Substantially all of the volatile material in the slurry is then allowed to evaporate. The removable support sheet is then detached from the green braze precursor tape. The resulting tape usually has a thickness in the range of about 100 microns to about 1000 microns. The free-standing, green braze precursor tape can then be cut to a size appropriate for the particular brazing technique and applied to the location where brazing will take place. Various techniques can be used to temporarily hold the tape in place, prior to the actual brazing step. Examples include the use of adhesives, spot-welds, or tack-welds.

The use of the braze material in the form of a metal sheet or "foil" is also known in the art. As one example, the braze precursor material, in the form of a powder, can be first combined with a binder and/or with additional metal powder which is similar in composition to the substrate. The combined material is then deposited onto a support sheet, e.g., by a thermal spray technique such as HVOF (high velocity oxy-fuel). The support sheet is then removed, leaving the desired metal foil. Foils of this type can also be prepared by other methods as well, e.g., an amorphous metal ribbon technique. A "pre-forming" technique could also be used, wherein the previously-described green tape is partially fired (off the part), to form a metallic sheet. Prior to the actual brazing step, the foil can be temporarily held in place on the substrate, as described above.

The braze precursor material can be disposed on the substrate via cold spray, where particles are accelerated using a supersonic carrier gas at a sufficiently low temperature to prevent melting or interdiffusion of the particles, resulting in a dense deposit on the substrate surface.

Methods for in-situ repair of a gas turbine engine component are also provided. The method includes providing a substrate having a repair region thereon; disposing a braze precursor material comprising a nickel powder, an aluminum powder, and a platinum group metal powder on the braze region; and initiating an exothermic reaction of the braze precursor material to repair the repair region of the substrate.

Accordingly, the present subject matter is directed to a method of furnace-less brazing, such as repair of a substrate or joining of components. More particularly, the present subject matter provides a braze precursor material capable of sustaining an exothermic reaction such that the heat from the exothermic reaction facilitates brazing of a substrate. Advantageously, the methods provided herein allow for the local, ambient-atmosphere repair of metal components, including components in the hot gas path of a gas turbine engine. The methods also allow for in-module, in-case, and on-wing repairs, as well as repairs on large structures, without the need for disassembly and furnace brazing. The methods reduce cycle time, cost, and labor of repairs.

The following examples are presented in order to provide a more complete understanding of the repair method. The specific techniques, conditions, materials and reported data set forth as illustrations are exemplary and should not be construed as limiting the scope of the inventive subject matter.

Figure 8:
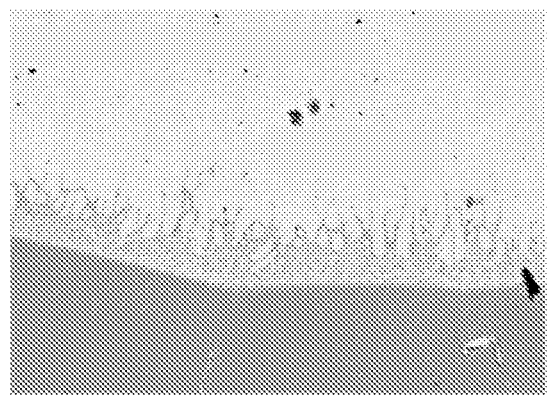
FIG. 8 illustrates an SEM microphotograph of a braze region according to exemplary embodiments of the present disclosure.

In an example, a substrate of GTD-222® nickel-based superalloy was provided. The braze precursor material comprised a 10 mm diameter cold-pressed pellet containing an elemental powder mixture of 37.5 atomic % palladium, 37.5 atomic % aluminum, balance nickel. The nickel particles have a D50 of 70 μm and the aluminum particles have a D50 of 20 μm. The braze precursor material was placed on the GTD-222® substrate. The braze material was heated with a torch to initiate an exothermic reaction. As shown in FIG. 8, the elemental powder constituents of the braze precursor material alloyed with the substrate surface, resulting in a thin reaction zone between the substrate and the braze.

Figure 9:
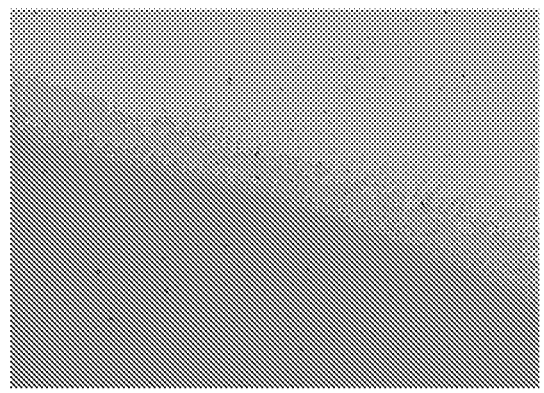
FIG. 9 illustrates an SEM microphotograph of a braze region according to exemplary embodiments of the present disclosure.

In yet another example, a substrate of Nimonic®-263 nickel-based superalloy was provided. The braze precursor material comprised a cold-pressed pellet approximately 12.5 mm in diameter and containing an elemental powder mixture of 37.5 atomic % palladium, 37.5 atomic % aluminum, balance nickel. The nickel particles have a D50 of 70 μm and the aluminum particles have a D50 of 20 μm. The braze precursor material was placed over a cavity in the Nimonic-263 substrate and heated with a torch to initiate an exothermic reaction. As shown in FIG. 9, the elemental powders making up the braze precursor material fully reacted and partially melted the substrate surface, resulting in a thin reaction zone between the substrate and the braze.

Figure 10:
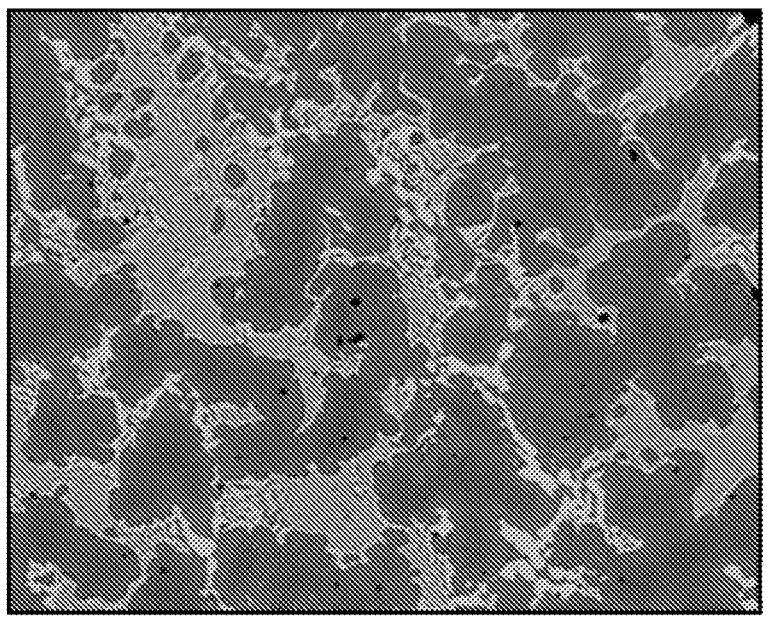
FIG. 10 illustrates an SEM microphotograph of a braze region according to exemplary embodiments of the present disclosure.

In yet another example, a substrate of Inconel®-625 was provided. The braze precursor material comprised a cold-pressed pellet approximately 12.5 mm in diameter and containing an elemental powder mixture of 40 atomic % palladium, 12 atomic % aluminum, balance nickel. The nickel particles have a D50 of 70 μm and the aluminum particles have a D50 of 20 μm. The braze precursor material was placed over a cavity in the nickel-based substrate and heated with a torch to initiate an exothermic reaction. The elemental powders making up the braze precursor material fully reacted and partially melted the substrate surface. As shown in FIG. 10, the resultant braze contains greater than 5 volume % of gamma-FCC phase. Specifically, gamma phase (FCC—(Ni,Pd)) appears dark in the microphotograph whereas $Pd_2Al$ with some gamma phase (FCC—(Ni,Pd)) phase appears brighter in the microphotograph.

While exemplary aspects provided herein are directed to gas turbine engines, the disclosure is not so limited. For example, it is conceivable that the braze material described herein can be used to repair any metallic or ceramic component, especially where the use of a braze furnace is not possible or desired.

Further aspects of the invention are provided by the subject matter of the following clauses:

1. A method of furnace-less brazing of a substrate, comprising: providing a substrate having a brazing region thereon; disposing braze precursor material containing a nickel powder, an aluminum powder, and a platinum group metal powder on the brazing region; and initiating an exothermic reaction of the braze precursor material such that the exothermic reaction produces a braze material that reaches a braze temperature above the liquidus temperature for the braze material.

2. The method of any preceding clause wherein the braze material cools to form a solidified braze material comprising a nickel alloy having at least 5 vol. % gamma face-centered-cubic (FCC) phase.

3. The method of any preceding clause wherein the braze precursor material comprises an atomic ratio of palladium to nickel of from about 0.43 to 2.33, wherein the braze precursor material comprises an atomic ratio of aluminum to a sum of palladium and nickel of from about 0.15 to 0.67, further wherein the braze precursor material comprises less than or equal to 50 atomic % of nickel.

4. The method of any preceding clause wherein the braze precursor material comprises an atomic ratio of palladium to nickel of from about 0.54 to 1.67, wherein the braze precursor material comprises an atomic ratio of aluminum to the sum of palladium and nickel of from about 0.16 to 0.47, further wherein the braze precursor material comprises less than or equal to 50 atomic % nickel.

5. The method of any preceding clause wherein the braze precursor material further comprises boron, cobalt, titanium, platinum, one or more metal oxides, or combinations thereof.

6. The method of any preceding clause wherein a ratio of a median particle size of the nickel powder to a median particle size of the aluminum powder is from about 7:1 to about 2:1.

7. The method of any preceding clause wherein a ratio of a median particle size of the platinum-group metal powder to a median size of the aluminum powder is from about 7:1 to about 2:1.

8. The method of any preceding clause wherein a median particle size of the aluminum powder is between about 3 μm to about 75 μm, such as from about 5 μm to about 35 μm.

9. The method of any preceding clause wherein a median particle size of the nickel powder is from about 50 μm to about 90 μm.

10. The method of any preceding clause wherein the braze temperature is above a liquidus temperature of the braze material.

11. The method of any preceding clause wherein the braze temperature is capable of partially melting an adjacent surface of the metal substrate to enhance bonding between the braze material and the substrate.

12. The method of any preceding clause wherein the braze region comprises a repair region comprising a pit, partial crack, or through-thickness crack in the substrate.

13. The method of any preceding clause wherein the braze region comprises a joint gap between two metallic substrates to be joined.

14. The method of any preceding clause wherein the substrate is part of a component for a gas turbine engine.

15. The method of any preceding clause comprising prior to initiating an exothermic reaction of the braze precursor material, disposing a heat source material on the braze precursor material on the braze region.

16. A braze precursor material, comprising: a nickel powder, an aluminum powder, and a platinum-group metal powder, the braze precursor material capable of producing a braze material having a braze temperature to propagate and sustain an exothermic reaction, wherein after the exothermic reaction a solidified braze material is formed, the solidified braze material comprising a nickel alloy having at least 5 vol. % gamma (FCC) phase.

17. The braze precursor material of any preceding clause wherein the braze precursor material comprises an atomic ratio of palladium to nickel of from about 0.43 to 2.33, wherein the braze precursor material comprise an atomic ratio of aluminum to the sum of palladium and nickel of from about 0.15 to 0.67, further wherein the braze precursor material comprises less than or equal to 50 atomic % nickel.

18. The braze precursor material of any preceding clause wherein the braze precursor material comprises an atomic ratio of palladium to nickel of from about 0.54 to 1.67, wherein the braze precursor material comprises an atomic ratio of aluminum to the sum of palladium and nickel of from about 0.16 to 0.47, further wherein the braze precursor material comprises less than or equal to 50 atomic % nickel.

19. The braze precursor material of any preceding clause wherein the braze precursor material further comprises boron, cobalt, titanium, platinum, one or more metal oxides, or combinations thereof.

20. The braze precursor material of any preceding clause wherein a median particle size of the aluminum powder is between about 3 μm to about 75 μm, such as from about 5 μm to about 35 μm, and wherein a median particle size of the nickel powder is from about 50 μm to about 90 μm.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A braze precursor material comprising:
    a first powder containing aluminum;
    a second powder containing a platinum-group metal; and
    the braze precursor material containing at least 18 atomic percentage of nickel,
    wherein the braze precursor material is capable of propagating and sustaining an exothermic reaction to produce a solidified braze material.

2. The braze precursor material of claim 1, wherein the exothermic reaction of the braze precursor material produces a braze temperature above a solidus temperature for the solidified braze material.

3. The braze precursor material of claim 2, wherein the solidified braze material comprises a nickel alloy having at least 5 vol. % gamma (FCC) phase.

4. The braze precursor material of claim 1, wherein the braze precursor material comprises an atomic ratio of palladium to nickel from about 0.43 to 2.33, wherein the braze precursor material comprises an atomic ratio of aluminum to a sum of palladium and nickel from about 0.15 to 0.67, and wherein the braze precursor material comprises less than or equal to 50 atomic percent of nickel.

5. The braze precursor material of claim 1, wherein the braze precursor material comprises an atomic ratio of palladium to nickel from about 0.54 to 1.67, wherein the braze precursor material comprises an atomic ratio of aluminum to a sum of palladium and nickel from about 0.16 to 0.47, wherein the braze precursor material comprises less than or equal to 50 atomic percent of nickel.

6. The braze precursor material of claim 1, wherein the braze precursor material further comprises boron, cobalt, titanium, platinum, one or more metal oxides, or combinations thereof.

7. The braze precursor material of claim 1, wherein a median particle size of the first powder containing aluminum is between about 3 μm to about 75 μm and wherein a median particle size of the second powder containing nickel is from about 50 μm to about 90 μm.

8. The braze precursor material of claim 1, wherein the braze precursor material comprises a pellet form.

9. The braze precursor material of claim 8, wherein the pellet form comprises a density in a range of 40-85% of theoretical.

10. The braze precursor material of claim 1, wherein the braze precursor material comprises a binder/solvent matrix.

11. The braze precursor material of claim 10, wherein the binder/solvent matrix comprise one of a paste or putty.

12. The braze precursor material of claim 11, wherein the one of paste or putty includes one or more of dispersants, wetting agents, deflocculants, stabilizers, anti-settling agents, plasticizers, emollients, lubricants, surfactants, anti-foam agents, and curing modifiers.

13. The braze precursor material of claim 1, wherein the braze precursor material is configured as a tape preform.

14. The braze precursor material of claim 13, wherein the tape preform includes one or more of dispersants, wetting agents, deflocculants, stabilizers, anti-settling agents, plasticizers, emollients, lubricants, surfactants, anti-foam agents, and curing modifiers.

15. The braze precursor material of claim 1, wherein braze precursor material is configured as a cold-sprayed preform.

16. The braze precursor material of claim 13, wherein the tape preform includes a removeable backing.

* * * * *